US012738018B2

(12) United States Patent
Kwong et al.

(10) Patent No.: US 12,738,018 B2
(45) **Date of Patent: *Sep. 15, 2026**

(54) SAFETY MONITOR FOR IMAGE MISCLASSIFICATION

(71) Applicant: ATI Technologies ULC, Markham (CA)

(72) Inventors: Tung Chuen Kwong, Markham (CA); Benjamin Koon Pan Chan, Markham (CA); David Porpino Sobreira Marques, Kleinburg (CA); Clarence Ip, Markham (CA); Hung Wilson Yu, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,061

(22) Filed: Mar. 17, 2023

(65) Prior Publication Data

US 2023/0230367 A1 Jul. 20, 2023

Related U.S. Application Data

(63) Continuation of application No. 16/424,162, filed on May 28, 2019, now Pat. No. 11,610,142.

(51) Int. Cl.

*G06V 10/44* (2022.01)
*G06F 17/18* (2006.01)

(Continued)

(52) U.S. Cl.

CPC ............ *G06V 10/454* (2022.01); *G06F 17/18* (2013.01); *G06F 18/24* (2023.01); *G06N 5/04* (2013.01);

(Continued)

(58) Field of Classification Search

CPC .. G06V 10/454; G06V 10/764; G06V 10/776; G06V 10/82; G06V 10/98;

(Continued)

(56) References Cited

U.S. PATENT DOCUMENTS

| | | | |
|---|---|---|---|
| 5,020,112 | A | 5/1991 | Chou |
| 5,657,420 | A | 8/1997 | Jacobs et al. |

(Continued)

FOREIGN PATENT DOCUMENTS

| | | | |
|---|---|---|---|
| EP | 3098762 | A1 | 11/2016 |
| EP | 3467662 | A1 | 4/2019 |

(Continued)

OTHER PUBLICATIONS

International Search Report and Written Opinion in International Application No. PCT/IB2020/054448, mailed Aug. 14, 2020, 9 pages.

(Continued)

*Primary Examiner* — Umair Ahsan

(74) *Attorney, Agent, or Firm* — Kowert, Hood, Munyon, Rankin & Goetzel, P.C.; Rory D. Rankin

(57) ABSTRACT

Systems, apparatuses, and methods for implementing a safety monitor framework for a safety-critical inference application are disclosed. A system includes a safety-critical inference application, a safety monitor, and an inference accelerator engine. The safety monitor receives an input image, test data, and a neural network specification from the safety-critical inference application. The safety monitor generates a modified image by adding additional objects outside of the input image. The safety monitor provides the modified image and neural network specification to the inference accelerator engine which processes the modified image and provides outputs to the safety monitor. The safety monitor determines the likelihood of erroneous processing of the (Continued)

original input image by comparing the outputs for the additional objects with a known good result. The safety monitor complements the overall fault coverage of the inference accelerator engine and covers faults only observable at the network level.

20 Claims, 10 Drawing Sheets

(51) Int. Cl.

| | |
|---|---|
| ***G06F 18/24*** | (2023.01) |
| ***G06N 5/04*** | (2023.01) |
| ***G06V 10/764*** | (2022.01) |
| ***G06V 10/776*** | (2022.01) |
| ***G06V 10/82*** | (2022.01) |
| ***G06V 10/98*** | (2022.01) |
| ***G06V 20/10*** | (2022.01) |

(52) U.S. Cl.

CPC .......... *G06V 10/764* (2022.01); *G06V 10/776* (2022.01); *G06V 10/82* (2022.01); *G06V 10/98* (2022.01); *G06V 20/10* (2022.01)

(58) Field of Classification Search

CPC ............... G06V 20/10; G06V 2201/10; G06V 2201/11; G06F 17/18; G06F 18/24; G06N 5/04; G06N 3/042

See application file for complete search history.

(56) References Cited

U.S. PATENT DOCUMENTS

| | | | | |
|---|---|---|---|---|
| 6,067,287 | A | 5/2000 | Chung-Ju et al. | |
| 6,215,915 | B1 | 4/2001 | Reyzin | |
| 6,295,374 | B1 | 9/2001 | Robinson et al. | |
| 6,678,404 | B1 | 1/2004 | Lee et al. | |
| 8,131,660 | B2 | 3/2012 | Davis et al. | |
| 8,345,979 | B2 | 1/2013 | Davis | |
| 8,369,595 | B1 | 2/2013 | Derakhshani et al. | |
| 9,319,137 | B2 | 4/2016 | Zhuge et al. | |
| 9,501,811 | B2 | 11/2016 | Michel | |
| 10,078,794 | B2 | 9/2018 | Pierce et al. | |
| 10,339,622 | B1 | 7/2019 | Tang et al. | |
| 10,438,091 | B2 | 10/2019 | Li | |
| 10,726,723 | B1* | 7/2020 | Madden | G08G 1/148 |
| 10,762,392 | B2 | 9/2020 | Zhang et al. | |
| 11,593,644 | B2* | 2/2023 | Miniskar | G06N 3/063 |
| 11,610,142 | B2 | 3/2023 | Kwong et al. | |
| 2003/0086616 | A1 | 5/2003 | Oh et al. | |
| 2004/0263911 | A1 | 12/2004 | Rodriguez et al. | |
| 2005/0104976 | A1 | 5/2005 | Currans | |
| 2006/0269119 | A1 | 11/2006 | Goldberg et al. | |
| 2007/0036420 | A1 | 2/2007 | Enachescu et al. | |
| 2007/0258640 | A1 | 11/2007 | Abe et al. | |
| 2008/0075378 | A1 | 3/2008 | Kim et al. | |
| 2008/0211915 | A1 | 9/2008 | McCubbrey | |
| 2015/0178246 | A1 | 6/2015 | Herrero Abellanas et al. | |
| 2015/0178889 | A1 | 6/2015 | Michel | |
| 2015/0206337 | A1 | 7/2015 | Roimela | |
| 2015/0278601 | A1* | 10/2015 | Nagamine | G06T 7/277 382/103 |
| 2015/0304648 | A1 | 10/2015 | Gulati et al. | |
| 2015/0350638 | A1 | 12/2015 | Beck | |
| 2015/0358755 | A1 | 12/2015 | Luo | |
| 2016/0062294 | A1 | 3/2016 | Murashima | |
| 2016/0092736 | A1* | 3/2016 | Mai | G06V 40/10 382/103 |
| 2016/0104070 | A1* | 4/2016 | Eslami | G06N 7/01 706/12 |
| 2016/0179434 | A1 | 6/2016 | Herrero Abellanas et al. | |
| 2016/0239682 | A1* | 8/2016 | Kapadia | G06F 16/5854 |
| 2016/0245178 | A1 | 8/2016 | Bhabhrawala | |
| 2017/0177458 | A1 | 6/2017 | Viggers et al. | |
| 2017/0206415 | A1 | 7/2017 | Redden | |
| 2017/0316312 | A1 | 11/2017 | Goyal | |
| 2018/0018864 | A1 | 1/2018 | Baker | |
| 2018/0032859 | A1 | 2/2018 | Park et al. | |
| 2018/0068429 | A1 | 3/2018 | Tan et al. | |
| 2018/0173698 | A1 | 6/2018 | Dubey et al. | |
| 2018/0189641 | A1 | 7/2018 | Boesch et al. | |
| 2018/0218303 | A1 | 8/2018 | Cole et al. | |
| 2018/0218502 | A1* | 8/2018 | Golden | G06T 7/11 |
| 2018/0223641 | A1* | 8/2018 | Ciezobka | G01N 15/0227 |
| 2018/0247412 | A1 | 8/2018 | Gooding et al. | |
| 2018/0330166 | A1 | 11/2018 | Redden et al. | |
| 2018/0373941 | A1 | 12/2018 | Kwant et al. | |
| 2019/0028752 | A1 | 1/2019 | Zhang et al. | |
| 2019/0050685 | A1 | 2/2019 | Kaminski et al. | |
| 2019/0080205 | A1* | 3/2019 | Kaufhold | G06V 10/82 |
| 2019/0106117 | A1 | 4/2019 | Goldberg | |
| 2019/0108384 | A1 | 4/2019 | Wang et al. | |
| 2019/0122384 | A1* | 4/2019 | Ertle | G06V 10/764 |
| 2019/0147220 | A1* | 5/2019 | Mccormac | G06V 20/41 382/103 |
| 2019/0147332 | A1 | 5/2019 | Agudu et al. | |
| 2019/0164265 | A1 | 5/2019 | Liao et al. | |
| 2019/0183456 | A1* | 6/2019 | Savadjiev | G06T 7/0014 |
| 2019/0220381 | A1* | 7/2019 | Pogorelik | G06F 18/2178 |
| 2019/0258251 | A1 | 8/2019 | Ditty et al. | |
| 2019/0318099 | A1* | 10/2019 | Carvalho | G06F 21/577 |
| 2019/0325305 | A1 | 10/2019 | Zhang et al. | |
| 2019/0332897 | A1 | 10/2019 | Chen et al. | |
| 2019/0332926 | A1* | 10/2019 | Lie | G06F 9/30014 |
| 2020/0005422 | A1 | 1/2020 | Subramanian et al. | |
| 2020/0037987 | A1 | 2/2020 | Silberman et al. | |
| 2020/0134432 | A1 | 4/2020 | Lagudu et al. | |
| 2020/0302285 | A1 | 9/2020 | Wang et al. | |
| 2020/0327378 | A1 | 10/2020 | Smith et al. | |

FOREIGN PATENT DOCUMENTS

| | | | | |
|---|---|---|---|---|
| EP | 3475875 | A1 | | 5/2019 |
| JP | 2007096613 | A | | 4/2007 |
| JP | 2013196265 | A | * | 9/2013 |
| JP | 2015191334 | A | | 11/2015 |
| JP | 2016085721 | A | | 5/2016 |
| JP | 2018005339 | | | 1/2018 |
| JP | 2020061066 | A | | 4/2020 |
| WO | 2014155639 | A | | 10/2014 |
| WO | 2017003887 | A1 | | 1/2017 |
| WO | 2017075939 | A1 | | 5/2017 |
| WO | 2019094843 | A1 | | 5/2019 |

OTHER PUBLICATIONS

Non-Final Office Action in U.S. Appl. No. 15/657,613, mailed Oct. 5, 2018, 12 pages.

Final Office Action in U.S. Appl. No. 15/657,613, mailed Mar. 8, 2019, 10 pages.

International Search Report and Written Opinion in International Application No. PCT/US2018/052358, mailed Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.

Notice of Allowance in U.S. Appl. No. 16/234,956, mailed May 5, 2020, 10 pages.

"BlackBerry QNX Platform for Instrument Clusters", BlackBerry QNX, 2018, 4 pages, https://blackberry.qnx.com/content/dam/qnx/products/instrument-clusters/instrument-clusters-product-brief.pdf. [Retrieved Jun. 17, 2019].

(56) References Cited

OTHER PUBLICATIONS

Zander, Justyna, "Functional Safety for Autonomous Driving", IS&T Symposium on Electronic Imaging 2017; Autonomous Vehicles and Machines 2017, Jan. 29-Feb. 2, 2017, 29 pages, Nvidia, https://www.imaging.org/Site/PDFS/Conferences/Electroinclmaging/EI2018/NVidia_JustynaZander_Imaging2017_Keynote.pdf. [Retrieved Jan. 22, 2021].
Non-Final Office Action in U.S. Appl. No. 16/427,941, mailed Apr. 29, 2021, 14 pages.
"Appendix 1 to the Oct. 2019 Update: Subject Matter Eligibility, Life Sciences & Data Processing Examples", Oct. 2019, 41 pages.
International Search Report and Written Opinion in International Application No. PCT/IB2020/054645, mailed Aug. 21, 2020, 8 pages.
Notice of Allowance in U.S. Appl. No. 16/427,941, mailed Aug. 31, 2021, 9 pages.
Non-Final Office Action in U.S. Appl. No. 17/548,393, mailed Oct. 4, 2022, 14 pages.
Tian, Yuchi at Virginia Edu et al., "Deep Test automated testing of deep-neural-network-driven autonomous cars", Software Engineering, ACM, 2 Penn Plaza, Suite 701 New York NY 10121-0701 USA, May 27, 2018, pp. 303-314.
Dwibedi, Debidatta et al., "Cut, Paste and Learn: Surprisingly Easy Synthesis for Instance Detection", 2017 IEEE International Conference on Computer Vision, Oct. 22, 2017, pp. 1310-1319.
Xiaofei, Xie, et al.; "DeepHunter: Hunting Deep Neural Network Defects via Coverage-Guided Fuzzing", Nov. 16, 2018; Retrieved from the Internet: URL: https://arxiv.org/pdf/1809.01266.pdf.
European Search Report European Application No. 20813760.4, mailed May 22, 2023, 12 pages.
Supplementary European Search Report in EP Application No. 20812662.3, mailed Oct. 30, 2023, 10 pages.
Final Office Action for U.S. Appl. No. 17/548,393, dated May 4, 2023, 7 pages.
Office Action for JP Patent Application No. 2021-570761, dated Sep. 5, 2023, 6 pages.
Office Action for KR Patent Application No. 10-2021-7042278, dated Sep. 14, 2023, 15 pages.
Notice of Allowance for U.S. Appl. No. 17/548,393, dated Sep. 11, 2023, 7 pages.
Suman Jana et al., DeepTest: Automated Testing of Deep-Neural-Network-drivenAutonomous Cars, ICSE'18, May 27-Jun. 3, 2018, Gothenburg, Sweden.
Office Action for JP Patent Application No. 2021-570317, dated Mar. 5, 2024, 8 pages.
Office Action for JP Patent Application No. 2024-013261, dated Mar. 5, 2024, Dec. 10, 2024.
Tian Yuchi et al. , "DeepTest: Automated Testing of Deep-Neural-Network-Driven Autonomous Cars" , 2018 IEEE/ACM 40th International Conference on Software Engineering (ICSE)[online] , IEEE , 2018 , pp. 303-314 , [Search date Dec. 3, 2024], Internet :<URL:https://ieeexplore.ieee.org/stamp/stamp.jsp?tp=&arnumber=8453089.
Shimizu Naoshige, GM Driverless car defeat google strongest contender 2019, mass production, Nikkei Automotive No. 85, Nikkei BP Ltd., Mar. 11, 2018, pp. 50-56.

* cited by examiner

SAFETY MONITOR FOR IMAGE MISCLASSIFICATION

CROSS REFERENCE TO RELATED APPLICATIONS

This application is a continuation of U.S. patent application Ser. No. 16/424,162, now U.S. Pat. No. 11,610,142, entitled "SAFETY MONITOR FOR IMAGE MISCLASSIFICATION", filed May 28, 2019, the entirety of which is incorporated herein by reference.

BACKGROUND

Description of the Related Art

An emerging technology field is machine learning, with a neural network being one type of a machine learning model. Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others.

In a typical deployment of a machine learning algorithm, a software application supplies a neural network to an inference accelerator hardware engine. When the inference accelerator is operating in a safety-critical environment, it is desired to monitor the inference accelerator to check for abnormal behavior. A typical implementation for monitoring the inference accelerator inserts monitoring logic into the inference accelerator processing hardware sub-blocks. For example, a machine check architecture is a mechanism whereby monitoring logic in the processing hardware checks for abnormal behavior. However, these checks, while providing monitoring in the lower levels of hardware, may overlook failure only observable at the output of the inference accelerator. Nor will this approach detect random intermittent faults at the neural network level. For example, the inference accelerator may have a misclassification error, such as a failure to detect an object-of-interest.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a safety monitor framework for a safety-critical neural network application are disclosed herein. In one implementation, a system includes a safety-critical neural network application, a safety monitor, and an inference accelerator engine. The safety monitor receives an input image, test data (e.g., test vectors), and a neural network specification (e.g., layers and weights) from the safety-critical neural network application. In one implementation, the test data includes a list of images with known good objects/images and corresponding classifications of these objects/images. In one implementation, the safety monitor modifies the input image to add additional objects outside of the boundaries of the input image. In such an embodiment, the modified image is larger than the input image to accommodate the additional objects outside of the boundaries of the original image. In one implementation, the configuration of the modified image (i.e., where the extra space and additional objects are inserted) is stored in a data structure (i.e., metadata) that is passed through the system flow with the modified image.

In one implementation, the additional objects include one or more redundant objects that are identical to objects found in a previous input image. In another implementation, the additional objects include one or more objects which were provided in the test vectors. The safety monitor provides the modified image to the inference accelerator. The inference accelerator processes the modified image and provides outputs back to the safety monitor. Based on the outputs generated by the inference accelerator, the safety monitor determines the likelihood of misclassification of the original input image. In one implementation, the safety monitor compares a known good result to the outputs which are associated with the modifications to determine the likelihood of misclassification of the original input image. The safety monitor provides an indicator of the likelihood of misclassification to the safety-critical application. With this approach, the safety monitor complements the overall fault coverage and protects against faults only observable at the output of the neural network.

Figure 1:
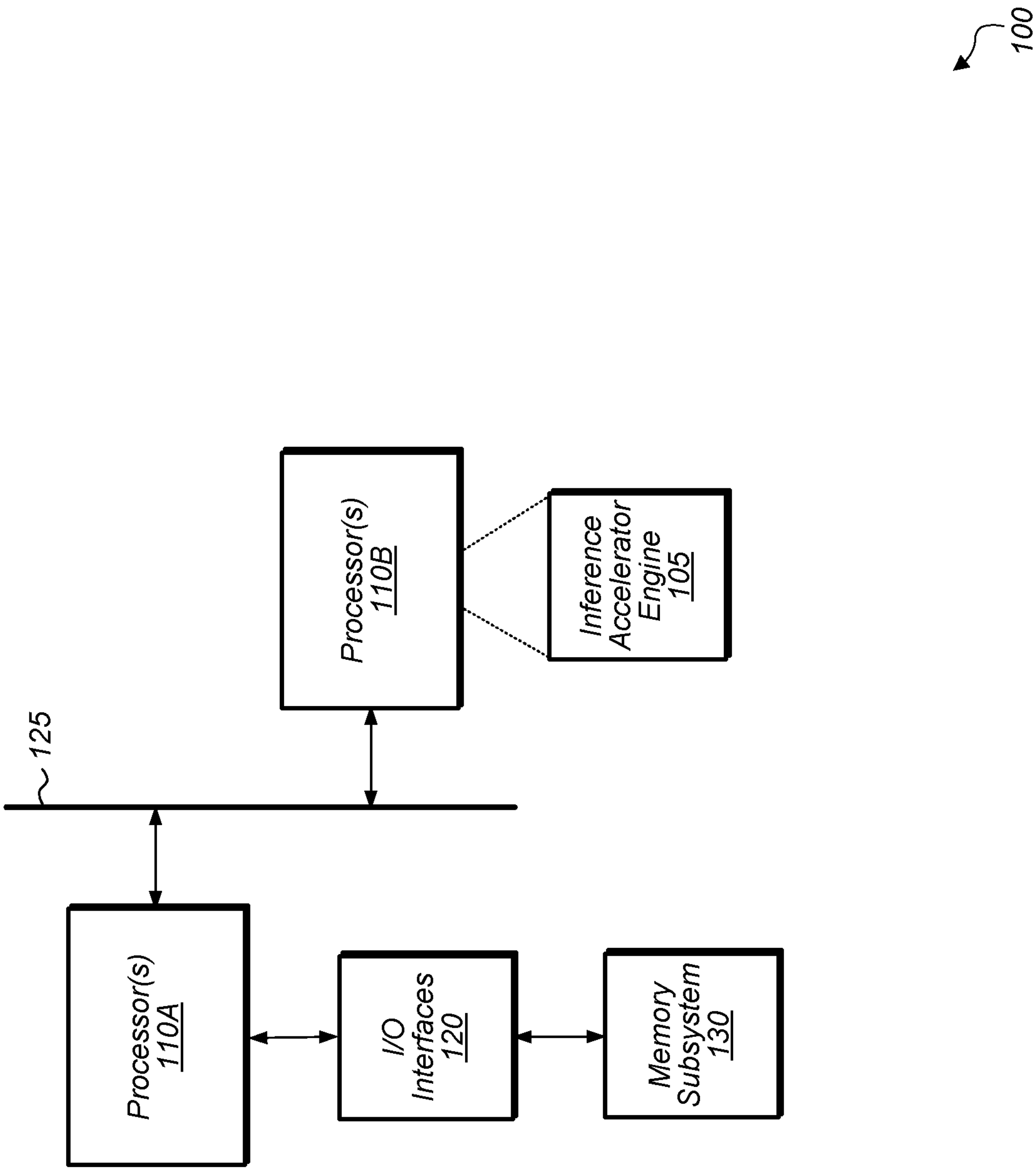
FIG. 1 is a block diagram of one implementation of a computing system.

Referring now to FIG. 1, a block diagram of one implementation of a computing system 100 is shown. In one implementation, computing system 100 includes at least inference accelerator engine 105, processor(s) 110A-B, input/output (I/O) interfaces 120, bus 125, and memory subsystem 130. In other implementations, computing system 100 can include other components and/or computing system 100 can be arranged differently. In one implementation, inference accelerator engine 105 is implemented on processor(s) 110B. Inference accelerator engine 105 is representative of any combination of software, firmware, and/or hardware for implementing various machine learning algorithms or machine learning models on processor(s) 110B.

In one implementation, inference accelerator engine 105 implements one or more layers of a convolutional neural network. For example, in this implementation, inference accelerator engine 105 implements one or more convolutional layers and/or one or more fully connected layers. In another implementation, inference accelerator engine 105 implements one or more layers of a recurrent neural network. Generally speaking, an "inference engine" or "inference accelerator engine" is defined as hardware and/or software which receives image data and generates one or more label probabilities for the image data. In some cases, an "inference engine" or "inference accelerator engine" is referred to as a "classification engine" or a "classifier".

Inference accelerator engine 105 is utilized in any of a variety of different applications which vary according to the implementation. For example, in one implementation, inference accelerator engine 105 analyzes an image or video frame to generate one or more label probabilities for the frame. For example, potential use cases include at least eye tracking, object recognition, point cloud estimation, ray tracing, light field modeling, depth tracking, and others. For eye tracking use cases, probabilities generated by inference accelerator engine 105 are based on learned patterns, dwell, transition angles, blink, etc. In other implementations, inference accelerator engine 105 is trained and customized for other types of use cases.

Inference accelerator engine 105 can be used by any of a variety of different safety-critical applications which vary according to the implementation. For example, in one implementation, inference accelerator engine 105 is used in an automotive application. For example, inference accelerator engine 105 controls one or more functions of a self-driving vehicle (i.e., autonomous vehicle), driver-assist vehicle, or advanced driver assistance system. In other implementations, inference accelerator engine 105 is trained and customized for other types of use cases. Depending on the implementation, inference accelerator engine 105 generates probabilities of classification results for various objects detected in an input image or video frame.

Processors(s) 110A-B are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with inference accelerator engine 105 is performed by processor(s) 110B. Additionally, inference accelerator engine 105 is implemented using any of these types of processing units and/or other types of processing elements. Memory subsystem 130 includes any number and type of memory devices. For example, the type of memory in memory subsystem 130 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. Memory subsystem 130 is accessible by inference accelerator engine 105 and processor(s) 110A-B. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. In some implementations, the entirety of computing system 100 or one or more portions thereof are integrated within a robotic system, self-driving vehicle, autonomous drone, surgical tool, or other types of mechanical devices or systems. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
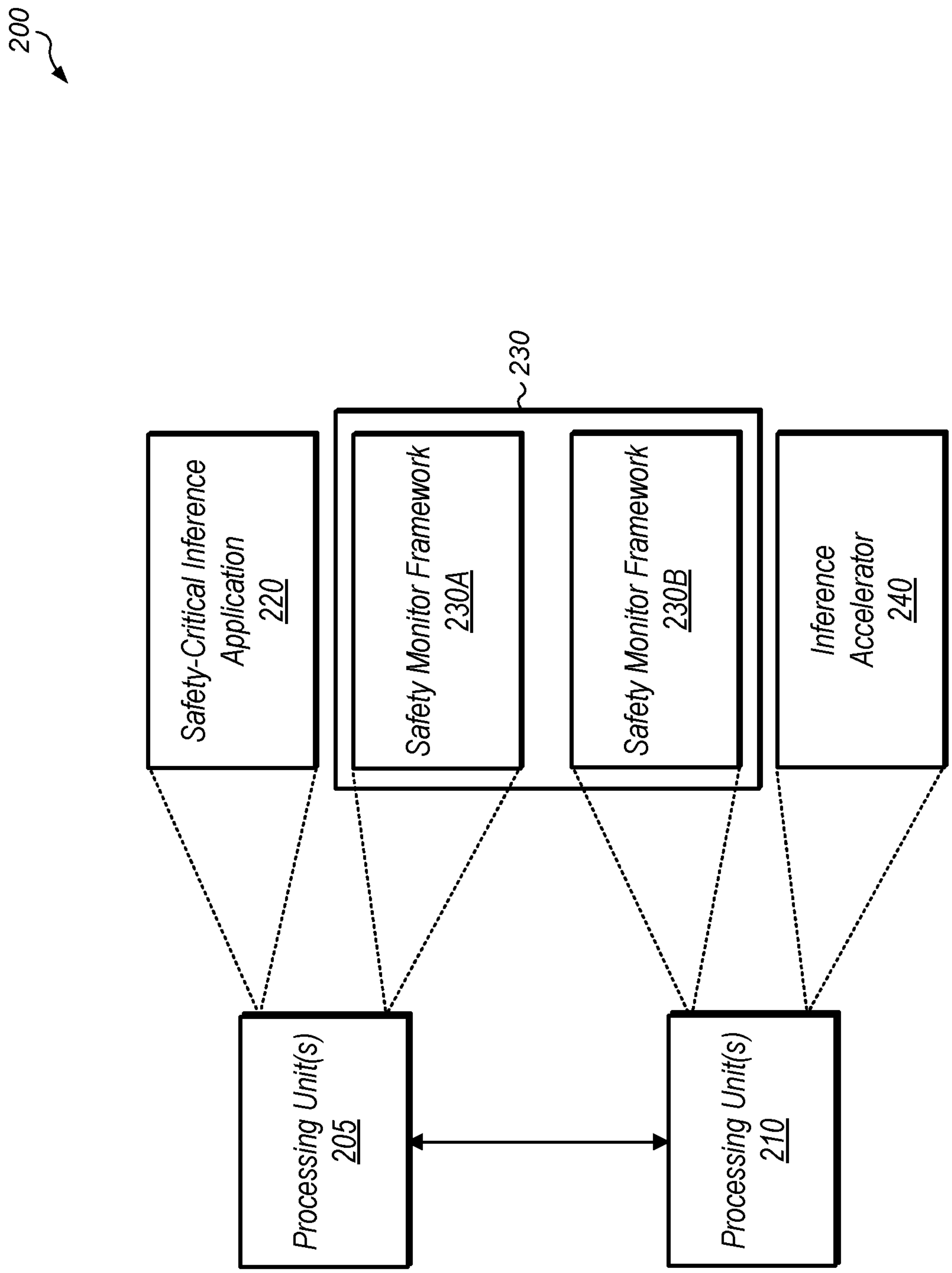
FIG. 2 is a block diagram of one implementation of a safety-critical inference application executing in a safety-critical system.

Turning now to FIG. 2, a block diagram of one implementation of a safety-critical inference application 220 executing in a safety-critical system 200 is shown. In one implementation, safety-critical system 200 includes at least processing unit(s) 205 and 210 which are representative of any number and type of processing units. It is noted that safety-critical system 200 can also include any number of other components which are not shown to avoid obscuring the figure. In one implementation, processing unit(s) 205 includes one or more central processing units (CPUs). In other implementations, processing unit(s) 205 can include other types of processing units. In one implementation, processing unit(s) 210 include one or more graphics processing unit (GPUs). In other implementations, processing unit(s) 210 can include other types of processing units (e.g., digital signal processors (DSPs), field programmable gate arrays (FPGAs), application specific integrated circuits (ASICs)).

In one implementation, safety-critical inference application 220 executes on processing unit(s) 205. Safety-critical inference application 220 is representative of any type of software application that executes in a hazardous environment where safety is of high importance. For example, in one implementation, safety-critical inference application 220 controls a self-driving or driver-assisted automobile or other vehicle. In other implementations, safety-critical inference application 220 operates within a robot, as the autopilot control mechanism in an airplane, or as part of other systems in various challenging, high-risk environments.

In one implementation, a first portion of safety monitor framework 230 (i.e., safety monitor framework 230A) executes on processing unit(s) 205 and a second portion of safety monitor framework 230 (i.e., safety monitor framework 230B) executes on processing unit(s) 210. In other implementations, safety monitor framework 230 executes entirely on processing unit(s) 205 or entirely on processing unit(s) 210. Inference accelerator 240 is representative of any combination of software and/or hardware that is used to implement one or more machine learning inference algorithms and/or machine learning inference models. In one implementation, inference accelerator 240 is implemented using dedicated hardware (e.g., FPGA, ASIC, IP core). In another implementation, inference accelerator 240 includes software instructions that are designed to execute on processing unit(s) 210. In other implementations, inference accelerator 240 can be any suitable combination of software and/or hardware. In one implementation, inference accelerator 240 operates according to a topology and weights/biases provided by safety-critical inference application 220.

Safety-critical inference application 220 provides images to be processed by inference accelerator 240. In one implementation, safety monitor framework 230 receives inputs that are being sent to inference accelerator 240 from safety-critical inference application 220 and safety monitor framework 230 modifies one or more of these inputs and then sends the modified inputs to safety-critical inference application 220. After inference accelerator 240 has processed the modified inputs, inference accelerator 240 sends the processing results to safety-critical inference application 220 via safety monitor framework 230. Safety monitor framework 230 analyzes the results to determine if inference accelerator 240 is malfunctioning. In one implementation, safety monitor framework 230 generates a confidence indicator which specifies how confident safety monitor framework 230 is that inference accelerator 240 accurately processed the inputs generated by safety-critical inference application 220. Safety monitor framework 230 conveys the confidence indicator and a modified version of the processing results to safety-critical inference application 220. In one implementation, safety-critical inference application 220 takes one or more corrective actions (e.g., shutting down, rebooting the system, retrying the same image, generating a warning signal for a user, reducing speed of the vehicle, changing an operating mode) if the confidence indicator is below a threshold.

Figure 3:
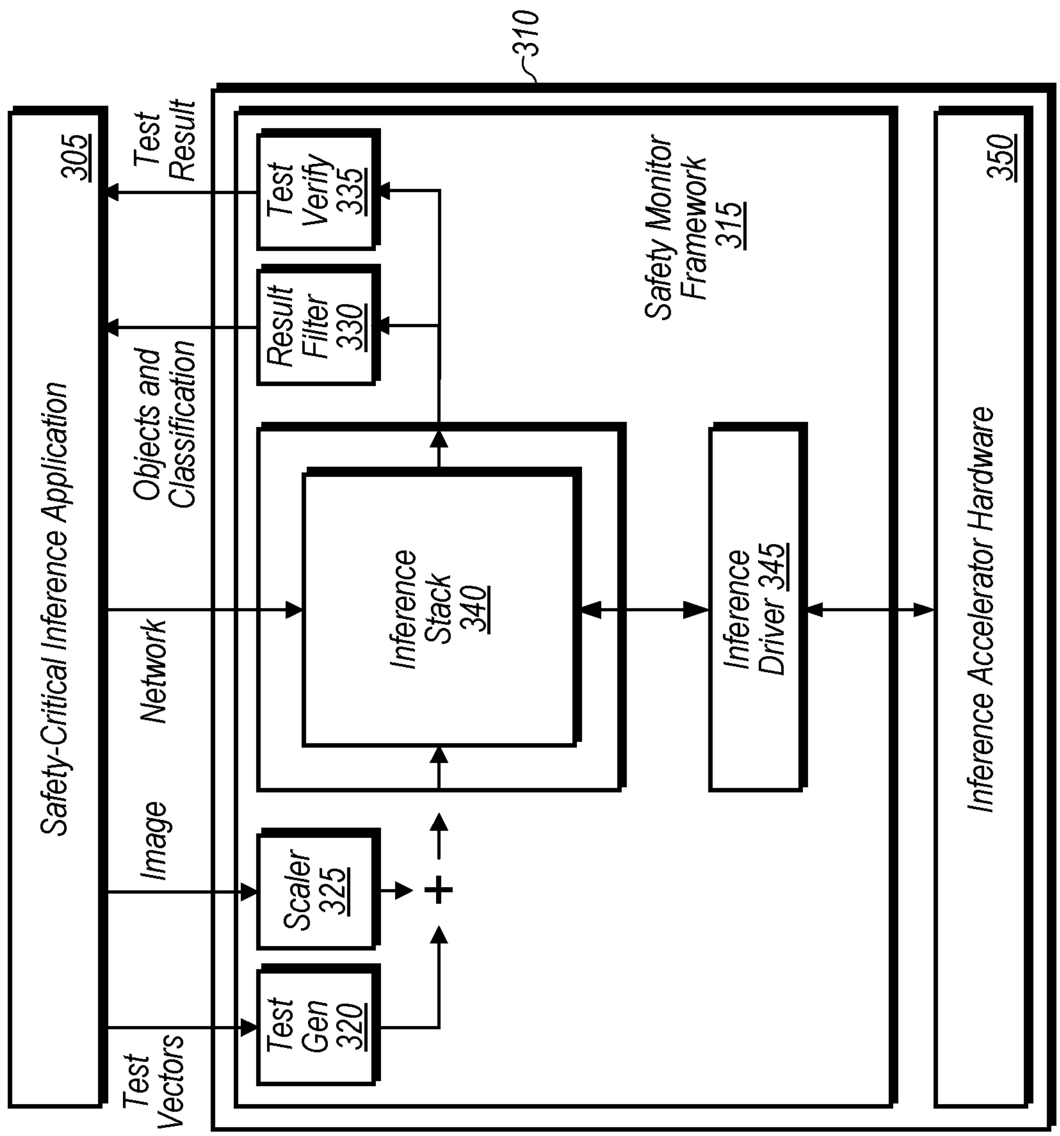
FIG. 3 is a block diagram of one implementation of an inference fault detection framework.

Referring now to FIG. 3, a block diagram of one implementation of an inference fault detection framework 300 is shown. In one implementation, a computing system 310 includes a safety monitor framework 315 and inference accelerator hardware 350. In one implementation, safety monitor framework 315 includes test generation unit 320, scaler unit 325, result filter 330, test verify unit 335, inference stack 340, and inference driver 345. In other implementations, safety monitor framework 315 includes other components and/or is arranged in other suitable manners. In one implementation, safety monitor framework 315 is designed to be compliant with the automatic safety integrity level (ASIL) risk classification scheme. In other implementations, safety monitor framework 315 can be designed to comply with other risk classification schemes in other types of environments.

In one implementation, safety-critical inference application 305 conveys an image, test vectors, and an inference network specification to safety monitor framework 315. The test vectors are received and used by test generation unit 320 to determine which objects to add to the original image. The test vectors are also used to determine whether the results generated by inference accelerator hardware 350 are accurate. In one implementation, a redundant object is added to the original image, with the redundant object identical to an object present in a previous image. In another implementation, a given object which was not present in a previous image is added to the original image. For example, in one implementation, the given object is an object that was identified in the test vectors as being a known good object in one or more test images. As used herein, a "known good object" is defined as an object which has a high probability of being correctly identified or processed in a consistent manner by inference accelerator hardware 350. In one implementation, the given object that is added to the original image is chosen based at least in part on having a high probability of occurring in the images being processed. Test generation unit 320 adds one or more extra given object(s) to the original image to create a modified image. The inference stack 340 conveys the modified image and the inference network specification to the inference accelerator hardware 350. In one implementation, the modified image and the inference network specification are conveyed to the inference accelerator hardware 350 via inference driver 345.

The inference accelerator hardware 350 processes the modified image according to the provided inference network specification, and then the inference accelerator hardware 350 returns the processing results to inference stack 340. Result filter 330 analyzes the results and also filters the results to remove any extra objects that were added to the original image. Result filter 330 conveys objects and classification results to application 305. The objects and classification results can include any type of data with the type varying according to the implementation. For example, in one implementation, if application 305 is looking for the number of objects in the original image, then the results will include the number of objects and their locations within the original image. In other implementations, other data can be conveyed in the objects and classification results depending on what application 305 is searching for in the original image.

In one implementation, the results from inference accelerator hardware 350 are analyzed by test verify unit 335. Test verify unit 335 determines whether the extra object(s) added to the original image were correctly processed and/or classified by the inference accelerator hardware 350. In other implementations, test verify unit 335 can use other suitable techniques for verifying the results generated by inference accelerator hardware 350. If test verify unit 335 determines that inference accelerator hardware 350 correctly processed the known good objects, then test verify unit 335 returns a passing test result indicator to application 305. Otherwise, if the known good objects were processed incorrectly, then test verify unit 335 returns a failing test result indicator to application 305. In response to receiving the failing test result indicator, application 305 can take any of various corrective actions (e.g., reboot, generate error, replay the same image).

Figure 4:
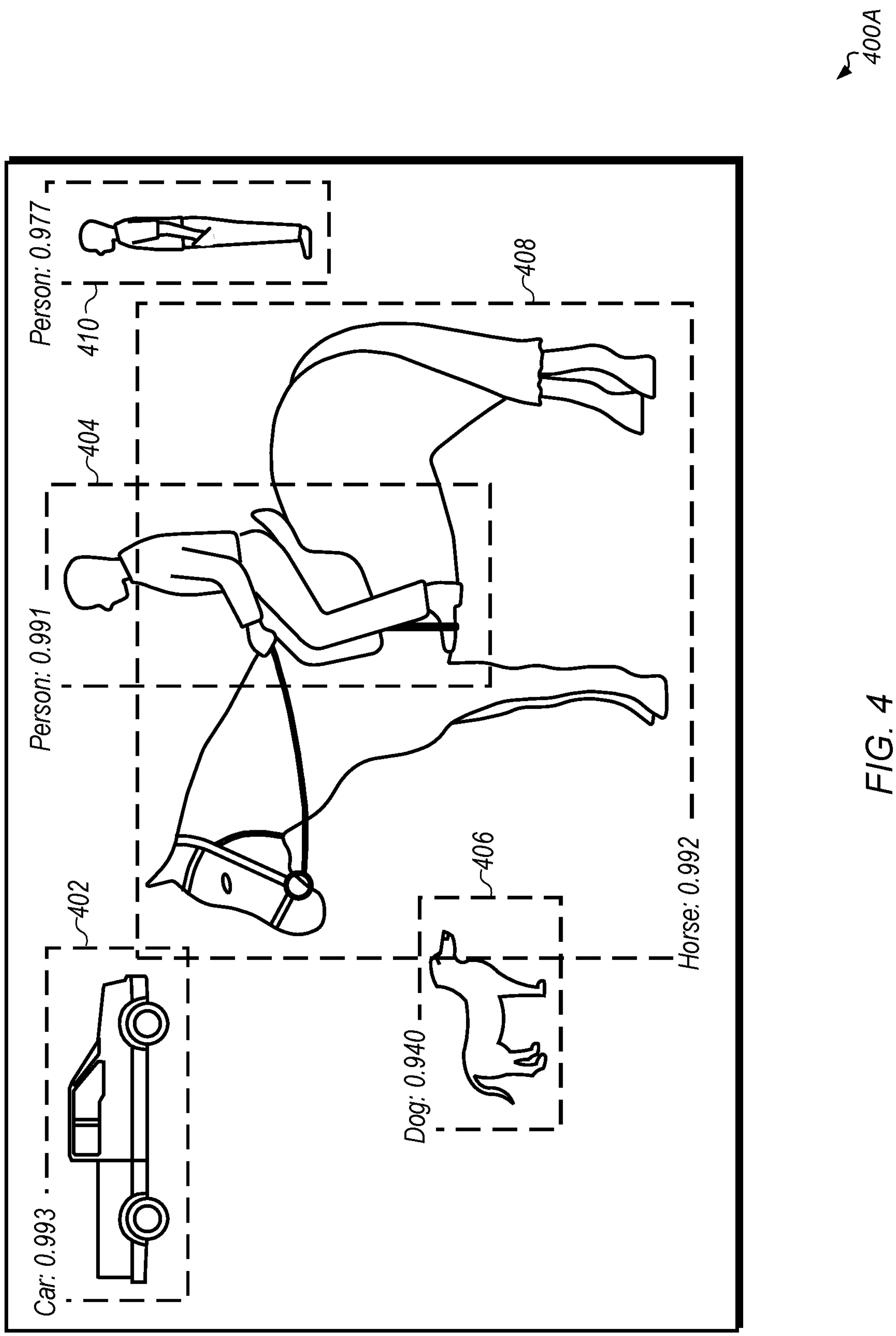
FIG. 4 is an example of an image which is sent from a safety-critical application to a safety monitor framework in accordance with one implementation.

Turning now to FIG. 4, an example of an image 400A which is sent from a safety-critical application to a safety monitor framework in accordance with one implementation is shown. In the example shown in FIG. 4, image 400A includes a truck 402, a person 404, a dog 406, a horse 408, and another person 410. It should be understood that this example of image 400A including these objects is merely indicative of one particular implementation. The likelihood of detection and correct identification is also shown on the top of the dashed box surrounding each identified object. In one implementation, these probabilities are determined during a training phase of the target inference accelerator engine. In one implementation, these probabilities are provided in the test data that the safety-critical application provides to the safety monitor framework for the particular neural network and/or for the target inference accelerator engine that is processing the image.

Figure 5:
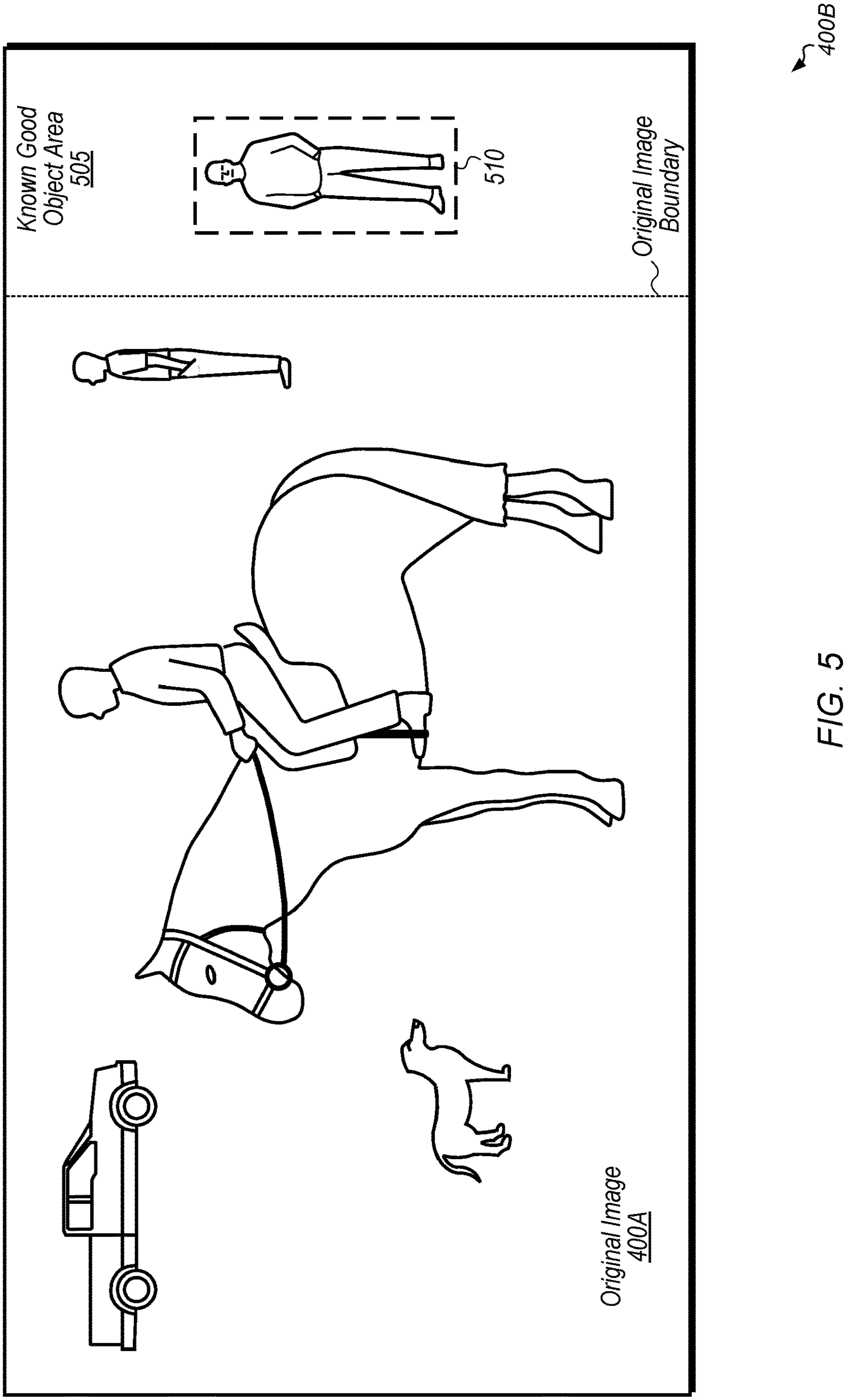
FIG. 5 is a modified image that has been generated by a safety monitor framework from an original image in accordance with one implementation.

Referring now to FIG. 5, a modified image 400B that has been generated by a safety monitor framework from an original image 400A in accordance with one implementation is shown. Modified image 400B is intended to represent image 400A (of FIG. 4) after being modified by a safety monitor framework (e.g., safety monitor framework 315 of FIG. 3). As shown, modified image 400B includes the original image 400A along with a known good object area 505 which has been added to the modified image 400B outside the boundaries (on the right side) of the original image 400A. The area of original image 400A on the left-side of modified image 400B remains unchanged. Accordingly, the original image 400A portion of modified image 400B includes all of the original objects as they appeared in image 400A (of FIG. 4).

In one implementation, known good object area 505 includes person 510 which is representative of a known good object found in one of the test vector images. In other implementations, known good object area 505 can include other numbers and/or types of objects. Depending on the implementation, the objects shown in known good object area 505 can include redundant objects which are exact replicas of objects in the original image and/or new objects which are not included as part of the original image 400A. Additionally, while known good object area 505 is shown on the right-side of modified image 400B, it should be understood that this is merely intended to represent one particular implementation. In other implementations, known good object area 505 can be added on top, on the left, and/or on the bottom of the original image 400A. In some implementations, a portion of the original image is used as a known good object area 505. For example, if a portion of the image is deemed non-essential for some reason (e.g., it is determined that image content in the particular area has no functional effect on the processing results), then that particular area can be used as a known good object area.

After generating modified image 400B, the safety monitor framework conveys the modified image 400B to the inference accelerator engine (e.g., inference accelerator hardware 350 of FIG. 3). The inference accelerator engine processes modified image 400B and then conveys outputs based on this processing to the safety monitor framework. The safety monitor framework determines if the objects added to known good object area 505 were identified and/or processed in accordance with the previously provided test data. If these added objects were correctly identified and/or processed properly, then the safety monitor framework provides a passing indicator to the safety-critical application. The safety monitor framework also filters the processing results related to the original image 400A by excluding the objects in known good object area 505. Then, the safety monitor framework provides these filtered results to the safety-critical application.

On the other hand, if the added objects were incorrectly identified and/or processed erroneously, then the safety monitor framework provides a failing indicator to the safety-critical application. In response to receiving the failing indicator, the safety-critical application takes one or more corrective applications. For example, in one implementation, the safety-critical application terminates in response to receiving the failing indicator. In another implementation, in response to receiving the failing indicator, the safety-critical application generates the same frame to be reprocessed by the inference accelerator engine. In other implementations, the safety-critical application performs other actions in response to receiving the failing indicator.

Figure 6:
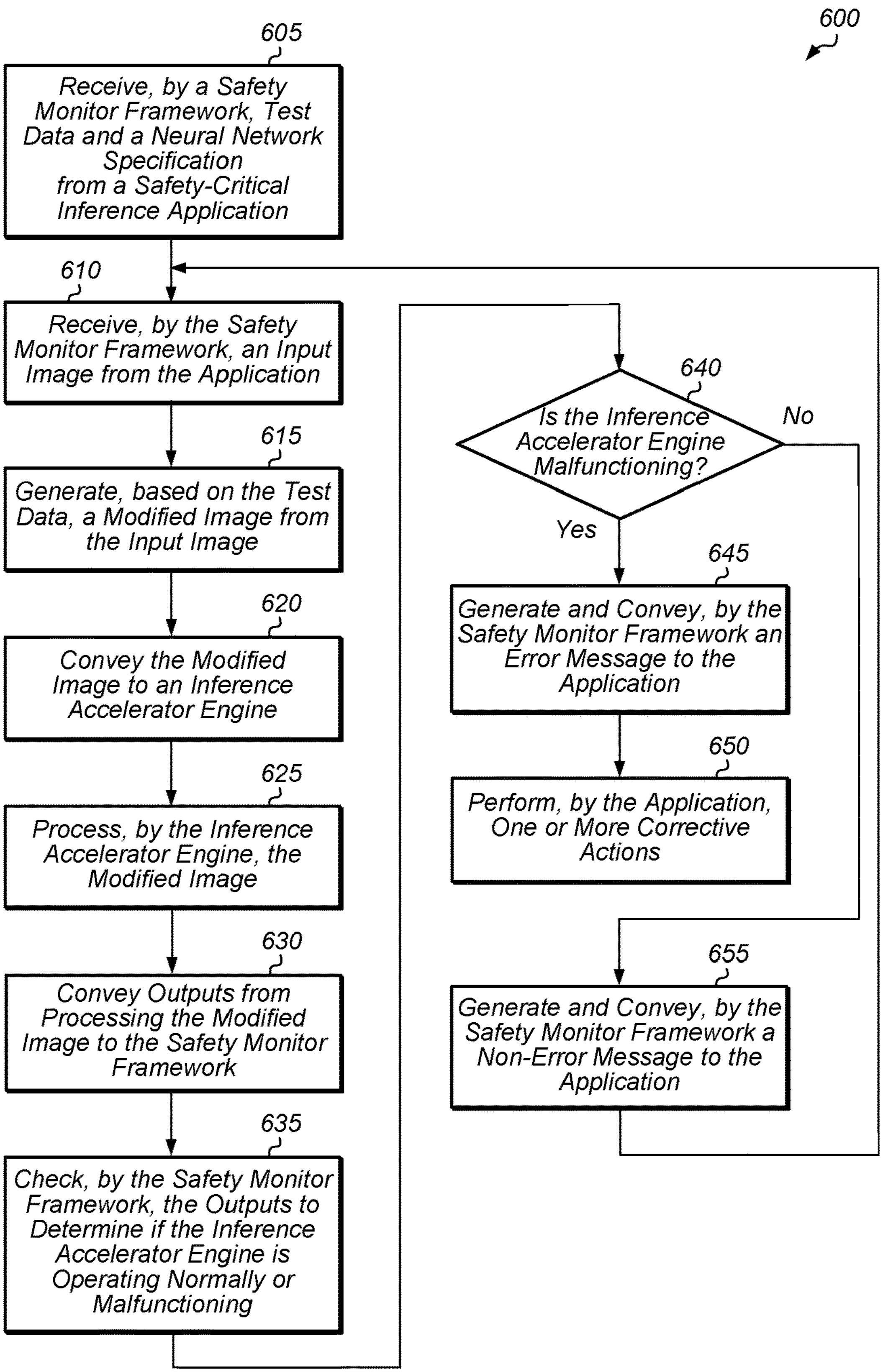
FIG. 6 is a generalized flow diagram illustrating one implementation of a method for operating a safety monitor framework for an inference accelerator.
Figure 7:
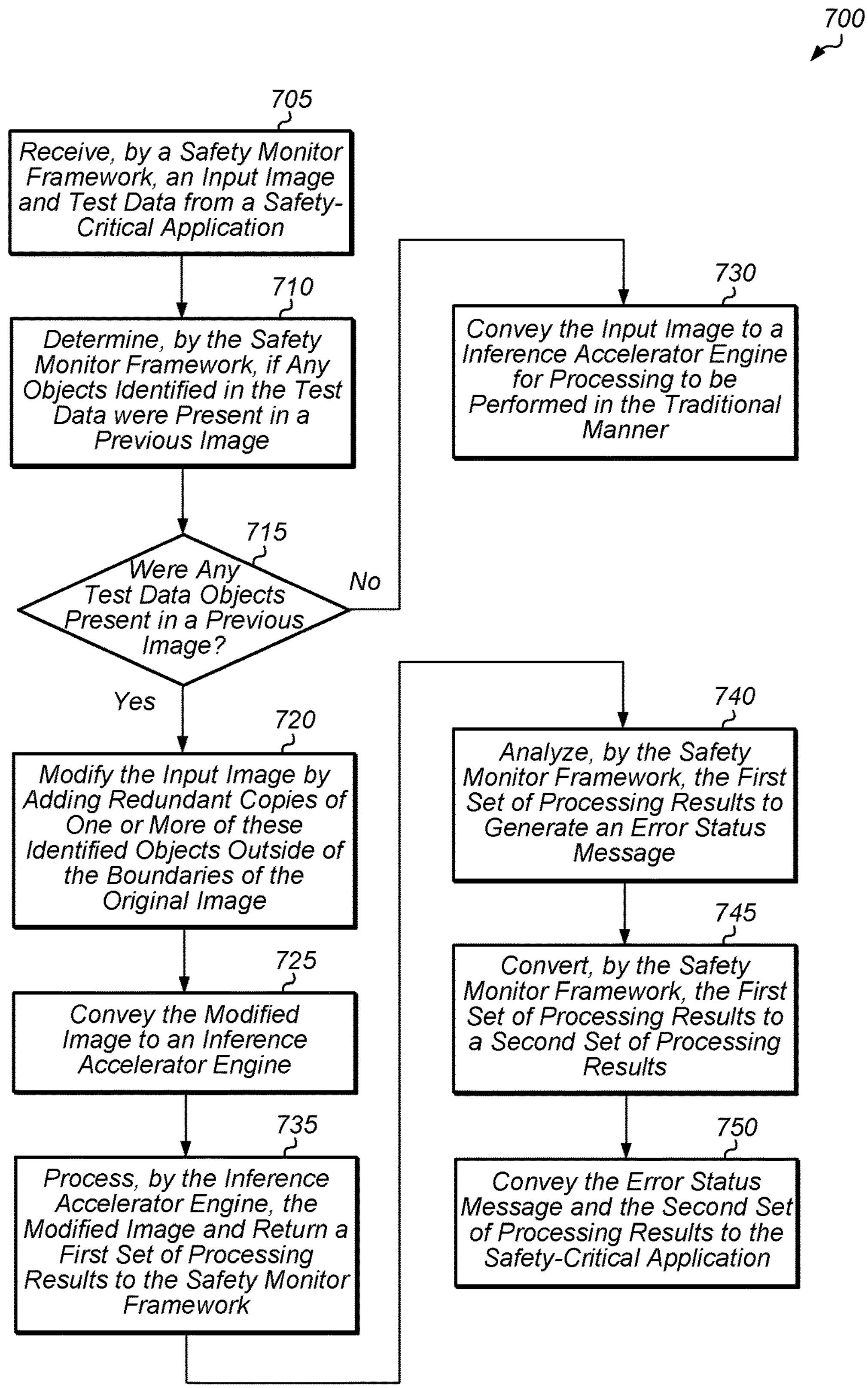
FIG. 7 is a generalized flow diagram illustrating one implementation of a method for implementing a safety monitor framework.
Figure 8:
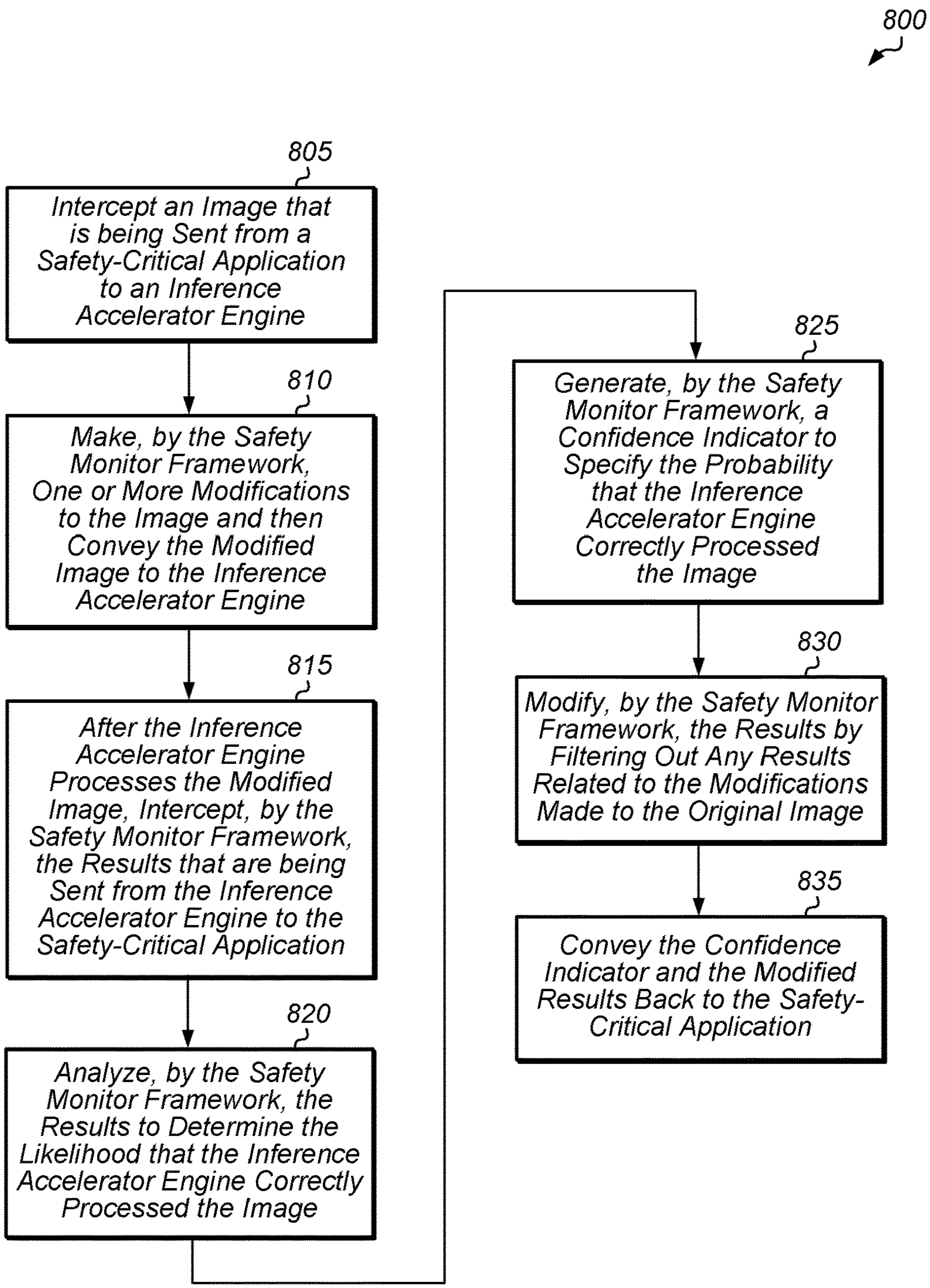
FIG. 8 is a generalized flow diagram illustrating one implementation of a method for generating a confidence indicator for use by a safety-critical application.
Figure 9:
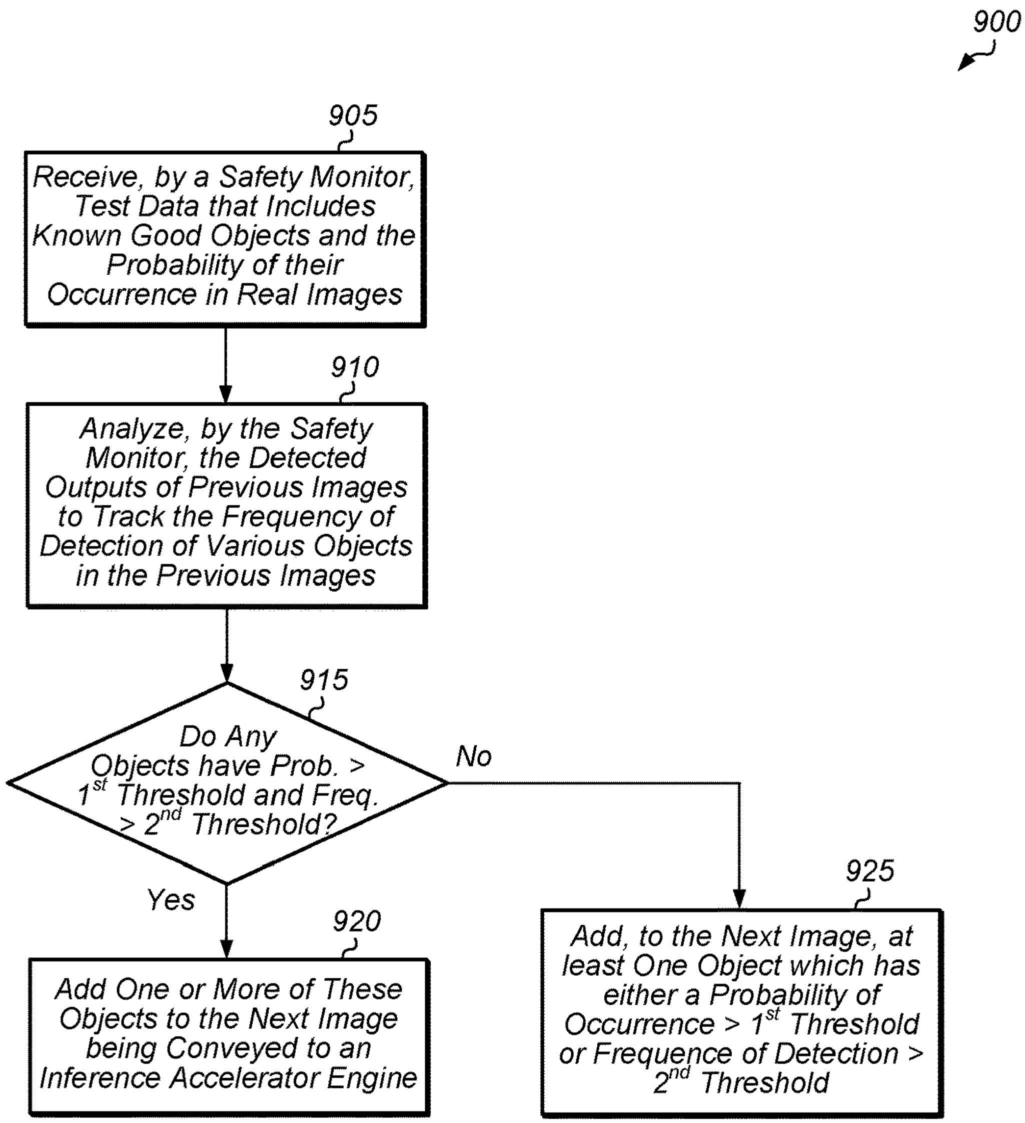
FIG. 9 is a generalized flow diagram illustrating one implementation of a method for determining which objects to use for modifying images.

Turning now to FIG. 6, one implementation of a method 600 for operating a safety monitor framework for an inference accelerator is shown. For purposes of discussion, the steps in this implementation and those of FIG. 7-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A safety monitor framework receives test data and a neural network specification from a safety-critical inference application (block 605). The test data can include training information, test vectors, and/or other metadata. In some cases, the test data is supplied or received ahead of time by the safety monitor framework prior to the initiation of method 600. In one implementation, the test vectors include objects that have been previously identified and/or have a high probability of being identified in the images being processed. Also, the safety monitor framework receives an input image from the safety-critical inference application (block 610). In one implementation, the input image is a real image that needs to be processed for a real-time application. Next, the safety monitor framework generates, based on the test data, a modified image from the input image (block 615). In one implementation, the modified image includes the input image with one or more extra objects added outside of the boundaries of the input image. For example, in one implementation, the safety monitor framework detects a first object within a previous input image. In this implementation, if the first object has been identified in the test data as having more than a threshold probability of being identified by an inference accelerator engine, then the safety monitor framework adds the first object in a space outside of the original input image. In this example, the modified image includes the original input image as well as the first object. It is noted that any number of objects can be added to an area outside of the original input image. The modified image is created from the combination of the original input image and the extra area.

Then, the safety monitor framework conveys the modified image to an inference accelerator engine (block 620). Next, the inference accelerator engine processes the modified image (block 625). It is noted that the inference accelerator engine is not aware that the original image has been modified. Accordingly, the inference accelerator engine performs normal processing as if the image had been received directly and without modification from the safety-critical application. Then, the inference accelerator engine conveys outputs from processing the modified image to the safety monitor framework (block 630). The safety monitor framework checks the outputs to determine if the inference accelerator engine is operating normally or malfunctioning (block 635). For example, if the extra object(s) added to the modified image are processed in the expected manner, then the safety monitor framework concludes that the inference accelerator engine is operating normally. Otherwise, if the results from the inference accelerator engine processing the extra object(s) are unexpected and/or do not match the results from the identical object(s) in the original image portion of the modified image, then the safety monitor framework concludes that the inference accelerator engine is malfunctioning.

If the safety monitor framework determines that the inference accelerator engine is malfunctioning (conditional block 640, "yes" leg), then the safety monitor framework generates and conveys an error message to the safety-critical inference application (block 645). The safety monitor framework can also provide other outputs from the inference accelerator engine to the safety-critical application in block 645. In response to receiving the error message, the safety-critical application performs one or more corrective actions (block 650). It is noted that the safety-critical application can optionally decide to continue sending subsequent images to the inference accelerator engine for processing in some cases, depending on the type of error that is detected and/or the current status of the safety-critical application. Alternatively, the safety-critical application can decide to terminate in response to receiving the error message. If the safety monitor framework determines that the inference accelerator engine is functioning normally (conditional block 640, "no" leg), then the safety monitor framework generates and conveys a non-error message to the safety-critical application (block 655). The safety monitor framework can also provide other outputs (e.g., filtered results) from the inference accelerator engine to the safety-critical application in block 655. In response to receiving the non-error message, the safety-critical application provides another image to the safety monitor framework and then method 600 returns to block 610.

Referring now to FIG. 7, one implementation of a method 700 for implementing a safety monitor framework is shown. A safety monitor framework receives an input image and test data from a safety-critical application (block 705). The safety monitor framework determines if any objects identified in the test data were present in a previous image (block 710). It is assumed for the purposes of this discussion that the input image is part of a continuous sequence of images, such as a camera input stream. If any of the one or more objects identified by the test data were present in a previous image (conditional block 715, "yes" leg), then the safety monitor framework modifies the input image by adding redundant copies of one or more of these identified objects outside of the boundaries of the original image (block 720). Then, the safety monitor framework conveys the modified image to an inference accelerator engine (block 725). If none of the objects identified by the test data were present in a previous image (conditional block 715, "no" leg), then the safety monitor framework passes the input image to the inference accelerator engine with processing to be performed in the traditional manner (block 730). After block 730, method 700 ends.

After block 725, the inference accelerator engine processes the modified image and returns a first set of processing results to the safety monitor framework (block 735). The safety monitor framework analyzes the first set of processing results to generate an error status message (block 740). It is noted that the error status message refers to the error status, or likelihood thereof, of the inference accelerator engine. In one implementation, the error status message is a single bit which indicates that the inference accelerator engine is either functioning normally or malfunctioning. The safety monitor framework also converts the first set of processing results to a second set of processing results (block 745). In one implementation, the safety monitor framework converts the first set of processing results to the second set of processing results by removing, from the first set of processing results, any result data associated with the modifications to the original image. In other words, the second set of processing results are what the processing results would look like if the original image, rather than the modified image, had been processed by the inference accelerator engine. Next, the safety monitor framework conveys the error status message and the second set of processing results to the safety-critical application (block 750). After block 750, method 700 ends.

Turning now to FIG. 8, one implementation of a method 800 for generating a confidence indicator for use by a safety-critical application is shown. A safety monitor framework intercepts an image that is being sent from a safety-critical application to an inference accelerator engine (block 805). In one implementation, the safety monitor framework is interposed between the safety-critical application and the inference accelerator engine. In one implementation, neither the safety-critical application nor the inference accelerator engine are aware that the safety monitor framework is interposed between them. However, in other implementations, the safety-critical application and/or the inference accelerator engine are aware that the safety monitor framework is located in between them. The safety monitor framework makes one or more modifications to the image and then conveys the modified image to the inference accelerator engine (block 810). In one implementation, the one or more modifications include adding one or more extra objects to a space outside of the original image. For a video stream, one way to improve the confidence level in the case of object identification is to embed one similar object and one dissimilar object into the extra space in the next video frame (assuming the object is still in the next capture frame in close temporal distance).

After the inference accelerator engine processes the modified image, the safety monitor framework intercepts the results that are being sent from the inference accelerator engine to the safety-critical application (block 815). The safety monitor framework analyzes the results to determine the likelihood that the inference accelerator engine correctly processed the image (block 820). For example, in one implementation, the safety monitor framework determines whether the results indicate a misclassification occurred. If the results from processing modifications to the image are not consistent with the results provided with the test data, then the safety monitor framework would conclude that there is a relatively high likelihood that the inference accelerator incorrectly processed the original input image. In one implementation, a relatively high likelihood that the inference accelerator incorrectly processed the image is expressed with a relatively low (i.e., close to zero) confidence indicator.

Next, the safety monitor framework generates a confidence indicator to specify the probability that the inference accelerator engine correctly processed the image (block 825). Also, the safety monitor framework modifies the results by filtering out any results related to the modifications made to the original image (block 830). Then, the safety monitor framework conveys the confidence indicator and the modified results back to the safety-critical application (block 835). After block 835, method 800 ends.

Referring now to FIG. 9, one implementation of a method 900 for determining which objects to use for modifying images is shown. A safety monitor receives test data that includes known good objects and the probability of their occurrence in real images (block 905). In one implementation, a safety-critical application conveys the test data to the safety monitor. Also, the safety monitor analyzes the detected outputs of previous images to track the frequency of detection of various objects in the previous images (block 910).

The safety monitor determines if any objects have both a probability of occurrence that is greater than a first threshold and a frequency of detection in previous images that is greater than a second threshold (conditional block 915). It is noted that the values of the first threshold and the second threshold can vary according to the implementation. If any objects have both a probability of occurrence that is greater than a first threshold and a frequency of detection in previous images that is greater than a second threshold (conditional block 915, "yes" leg), then the safety monitor adds one or more of these objects to the next image being conveyed to an inference accelerator engine (block 920). Otherwise, if no objects have both a probability of occurrence that is greater than the first threshold and a frequency of detection in previous images that is greater than the second threshold (conditional block 915, "no" leg), then the safety monitor adds, to the next image, at least one object which has either a probability of occurrence that is greater than the first threshold or a frequency of detection in previous images that is greater than the second threshold (block 925). If no objects have either a probability of occurrence that is greater than the first threshold or a frequency of detection in previous images that is greater than the second threshold, then the safety monitor can choose to add another type of object or choose not to add any objects to the next image. It is noted that if no objects have both a probability of occurrence that is greater than the first threshold and a frequency of detection in previous images that is greater than the second threshold, the safety monitor can decrease the value of the first threshold and/or the value of the second threshold. After blocks 920 and 925, method 900 ends.

Figure 10:
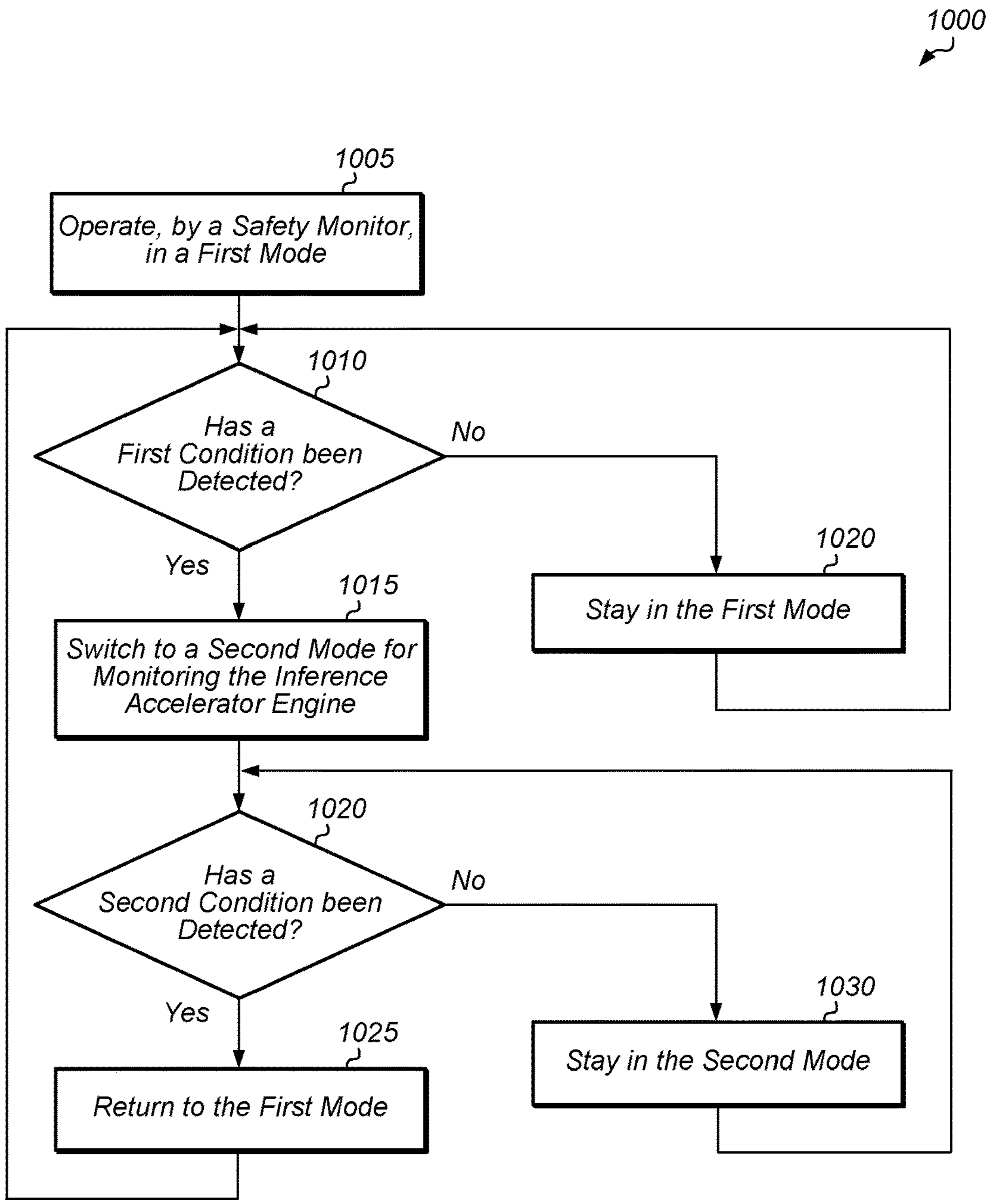
FIG. 10 is a generalized flow diagram illustrating one implementation of a method for a safety monitor framework changing operating modes.

Turning now to FIG. 10, one implementation of a method 1000 for a safety monitor framework changing operating modes is shown. A safety monitor in a safety-critical system with a safety-critical application and an inference accelerator engine starts up by operating in a first mode (block 1005). In one implementation, while operating in the first mode, the safety monitor sends real image data to the inference accelerator engine for classification. If the safety monitor detects a first condition (conditional block 1010, "yes" leg), then the safety monitor switches to a second mode for monitoring the inference accelerator engine (block 1015). It is noted that the "second mode" can also be referred to herein as a "safety mode". In one implementation, when operating in the second mode, the safety monitor generates experimental image data and conveys the experimental image data to the inference accelerator engine for classification. It is noted that the "experimental image data" can also be referred to herein as "known good object image data". In this implementation, after the inference accelerator engine generates classification results for the experimental image data, the safety monitor generates a confidence indicator based on an analysis of the classification results, with the confidence indicator representing a probability that the results are accurate.

In one implementation, the first condition is receiving a signal from the safety-critical application that enhanced monitoring should be performed. For example, a particularly important section of code within the application may be detected, the application may determine that increased scrutiny of the inference accelerator engine is desired during the period of time that this section of code is being executed. In another implementation, the first condition is detecting abnormal behavior associated with the inference accelerator engine. In a further implementation, the first condition is a timer expiring. In other implementations, the first condition can be other types of conditions.

In one implementation, when operating in the first mode, the safety monitor modifies one out of every N images, where N is a positive integer greater than one. In this implementation, when operating in the second mode, the safety monitor modifies one of every M images, where M is a positive integer that is less than N. If the safety monitor does not detect the first condition (conditional block 1010, "no" leg), then the safety monitor stays in the first mode (block 1020). After block 1020, method 1000 returns to conditional block 1010.

After block 1015, if the safety monitor detects a second condition (conditional block 1020, "yes" leg), then the safety monitor returns to the first mode (block 1025). In one implementation, the second condition is receiving a signal from the safety-critical application to re-enter the first mode. In another implementation, the second condition is detecting a return to normal behavior by the inference accelerator engine. In a further implementation, the second condition is the value of a timer being in a particular range. In other implementations, the second condition can be other types of conditions. After block 1025, method 1000 returns to conditional block 1010. Otherwise, if the safety monitor does not detect the second condition (conditional block 1020, "no" leg), then the safety monitor stays in the second mode (block 1030). After block 1030, method 1000 returns to conditional block 1020. It should be understood that in other implementations, the safety monitor operates in more than two different types of modes. In these implementations, the frequency at which the inference accelerator engine can be adjusted at a finer granularity depending on the status of the application and/or the inference accelerator engine. For example, the safety monitor can change from modifying every tenth frame, every ninth frame, every eighth frame, every seventh frame and so on. Alternatively, the safety monitor can switch between generating experimental image data every other frame, every third frame, every fourth frame, and so on.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:

a processor comprising circuitry configured to:

track a frequency of detection of one or more objects in previously received image data;

add at least one object of the one or more objects to current image data received subsequent to the previously received image data by inserting pixel data representing the at least one object into the current image data to generate modified image data, responsive to a frequency of detection of the at least one object in the previously received image data exceeding a first threshold; and generate an indication corresponding to a calculated likelihood of misclassification of the current image data, based at least in part on processing the modified image data; and perform an action in response to the indication.

2. The system as claimed in claim 1, wherein the processor is configured to add the at least one object outside a boundary of an image corresponding to the current image data, to generate the modified image data.

3. The system as claimed in claim 1, wherein the processor is configured to generate the indication based at least in part on an output of a machine learning model.

4. The system as claimed in claim 1, wherein the processor is further configured to:

cause the modified image data to be processed by transmitting the modified image data to an inference accelerator; and receive, from the inference accelerator, at least one output indicative of processing of the modified image data by the inference accelerator.

5. The system as claimed in claim 4, wherein the current image data is deemed misclassified, responsive to the at least one output not being consistent with a given test vector data corresponding to the current image data.

6. The system as claimed in claim 1, wherein the at least one object, represented by the pixel data, is selected based at least in part on a given test vector data corresponding to the previously received image data.

7. The system as claimed in claim 1, wherein the action comprises causing a safety-critical application to perform at least one of:

terminating operation;

re processing a same image;

rebooting a system;

generating a warning signal;

reducing a speed of a vehicle; or changing an operating mode.

8. A method comprising:

tracking, by a processor comprising circuitry, a frequency of detection of one or more objects in previously received image data; and adding, by the processor, at least one object of the one or more objects to current image data received subsequent to the previously received image data by inserting pixel data representing the at least one object into the current image data to generate modified image data, responsive to a frequency of detection of the at least one object in the previously received image data exceeding a first threshold;

generating an indication corresponding to a calculated likelihood of misclassification of the current image data, based at least in part on processing the modified image data; and performing an action in response to the indication.

9. The method as claimed in claim 8, further comprising adding, by the processor, the at least one object outside a boundary of an image corresponding to the current image data, to generate the modified image data.

10. The method as claimed in claim 8, further comprising generating the indication based at least in part on an output of a machine learning model.

11. The method as claimed in claim 8, further comprising:

causing, by the processor, the modified image data to be transmitted to an inference accelerator; and receiving, by the processor from the inference accelerator, at least one output indicative of processing of the modified image data by the inference accelerator.

12. The method as claimed in claim 11, wherein the current image data is deemed misclassified, responsive to the at least one output not being consistent with a given test vector data corresponding to the current image data.

13. The method as claimed in claim 8, wherein the at least one object, represented by the pixel data, is selected based at least in part on a given test vector data corresponding to the previously received image data.

14. The method as claimed in claim 11, wherein the at least one object is identified as an object having a calculated probability of being correctly identified by the inference accelerator in the previously received image data, exceeding a second threshold.

15. A system comprising:

an inference accelerator comprising circuitry; and a processor comprising circuitry configured to:

track a frequency of detection of one or more objects in previously received image data;

add at least one object of the one or more objects to current image data received subsequent to the previously received image data by inserting pixel data representing the at least one object into the current image data to generate modified image data, responsive to a frequency of detection of the at least one object in the previously received image data exceeding a first threshold;

generate an indication corresponding to a calculated likelihood of misclassification of the current image data, based at least in part on processing of the modified image data by the inference accelerator; and perform an action in response to the indication.

16. The system as claimed in claim 15, wherein the processor is configured to add the at least one object outside a boundary of an image corresponding to the current image data, to generate modified image data.

17. The system as claimed in claim 15, wherein the inference accelerator is configured to execute a machine learning model.

18. The system as claimed in claim 15, where in the processor is further configured to:

transmit the modified image data to the inference accelerator; and receive, from the inference accelerator, at least one output indicative of processing of the modified image data by the inference accelerator.

19. The system as claimed in claim 15, wherein the at least one object is selected based at least in part on a given test vector data corresponding to the previously received image data.

20. The system as claimed in claim 15, wherein the at least one object is identified as an object having a calculated probability of being correctly identified by the inference accelerator in previously processed image data.

* * * * *